(12) United States Patent
Jung et al.

(10) Patent No.: US 11,443,135 B2
(45) Date of Patent: Sep. 13, 2022

(54) METHOD FOR MONITORING OBJECT AND ELECTRONIC DEVICE FOR SUPPORTING THE SAME

(71) Applicant: Samsung Electronics Co., Ltd., Gyeonggi-do (KR)

(72) Inventors: Minsung Jung, Gyeonggi-do (KR); Mihyun Jeong, Gyeonggi-do (KR); Woocheol Jung, Gyeonggi-do (KR); Seungnyun Kim, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 16/787,264

(22) Filed: Feb. 11, 2020

(65) Prior Publication Data
US 2020/0257935 A1    Aug. 13, 2020

(30) Foreign Application Priority Data
Feb. 12, 2019   (KR) .................. 10-2019-0016078

(51) Int. Cl.
*G06V 20/00*  (2022.01)
*G06K 9/62*   (2022.01)
*G06V 20/20*  (2022.01)

(52) U.S. Cl.
CPC .......... *G06K 9/6253* (2013.01); *G06V 20/20* (2022.01)

(58) Field of Classification Search
CPC .......... G06K 9/00; G06K 9/202; G06K 9/222; G06K 9/2011; G06K 9/72; G06K 9/00718; G06K 9/00797; G06K 9/6217; G06K 9/03; G06K 9/38; G06K 9/6253; G06V 20/20; G06F 17/30257; G06F 17/3024; G06F 17/3072; G06F 17/30243; G06F 17/30249; G06F 17/30274; H04N 1/40062
See application file for complete search history.

(56) References Cited

U.S. PATENT DOCUMENTS

| 5,136,661 A | * | 8/1992 | Kobayasi | ............... | G06K 9/00 382/209 |
| 5,546,475 A | | 8/1996 | Bolle et al. | | |

(Continued)

FOREIGN PATENT DOCUMENTS

| KR | 10-1646000 B1 | 8/2016 |
| KR | 10-2017-0093421 A | 8/2017 |

(Continued)

OTHER PUBLICATIONS

International Search Report dated May 27, 2020.

*Primary Examiner* — Amir Alavi
(74) *Attorney, Agent, or Firm* — Cha & Reiter, LLC

(57) ABSTRACT

An electronic device according to certain embodiments may include a camera, a memory, and at least one processor, wherein the at least one processor is configured to: obtain an image through the camera; obtain an image of at least one object from the obtained image; determine whether the image of the at least one object corresponds to an image of an object stored in the memory; output about a request for information about the at least one object, based at least in part on the determination; and obtain the information about the at least one object, based at least in part on information received from an external source.

18 Claims, 13 Drawing Sheets

(56) References Cited

U.S. PATENT DOCUMENTS

| | | | | |
|---|---|---|---|---|
| 5,724,447 | A * | 3/1998 | Fukushima | G06V 10/895 |
| | | | | 382/152 |
| 7,190,814 | B2 * | 3/2007 | Miichi | G07C 9/257 |
| | | | | 382/209 |
| 7,425,986 | B2 * | 9/2008 | Kawai | H04N 5/23206 |
| | | | | 348/211.3 |
| 7,595,834 | B2 * | 9/2009 | Kawai | H04N 7/18 |
| | | | | 348/333.02 |
| 7,720,775 | B2 | 5/2010 | Shimomura et al. | |
| 8,271,511 | B2 * | 9/2012 | Bichigov | G06F 16/51 |
| | | | | 707/758 |
| 8,882,591 | B2 * | 11/2014 | Kawamoto | G06T 19/006 |
| | | | | 463/31 |
| 9,232,228 | B2 * | 1/2016 | Karkkainen | H04N 19/507 |
| 9,294,710 | B2 * | 3/2016 | Lim | H04N 21/4147 |
| 9,372,120 | B2 * | 6/2016 | Abreo | G01J 5/04 |
| 9,805,263 | B2 * | 10/2017 | Schneider | G06V 20/20 |
| 10,403,446 | B2 | 9/2019 | Moon et al. | |
| 2011/0044602 | A1 * | 2/2011 | Lim | H04N 21/44008 |
| | | | | 386/E5.002 |
| 2013/0182126 | A1 | 7/2013 | Watanabe et al. | |
| 2015/0010238 | A1 | 1/2015 | Lee et al. | |
| 2020/0094397 | A1 | 3/2020 | Young et al. | |

FOREIGN PATENT DOCUMENTS

| | | |
|---|---|---|
| KR | 10-1848149 B1 | 5/2018 |
| KR | 10-2018-0102331 A | 9/2018 |
| WO | 2014/018225 A1 | 1/2014 |

* cited by examiner

| OBJECT IMAGE | NAME | LOCATION | FLAG |
|---|---|---|---|
| 411 — 📱 | USER A'S MOBILE PHONE | ON BED IN ROOM 1 | 0 |
| 413 — 🎮 | - | ON SOFA IN LIVING ROOM | 1 |
| 415 — 🗑 | GARBAGE CAN IN MAIN ROOM | NEXT TO DESK IN ROOM 2 | 0 |

METHOD FOR MONITORING OBJECT AND ELECTRONIC DEVICE FOR SUPPORTING THE SAME

CROSS-REFERENCE TO RELATED APPLICATION(S)

This application is based on and claims priority under 35 U.S.C. 119 to Korean Patent Application No. 10-2019-0016078, filed on Feb. 12, 2019, in the Korean Intellectual Property Office, the disclosure of which is herein incorporated by reference in its entirety.

BACKGROUND

1) Field

Certain embodiments relate to a method for monitoring an object and an electronic device for supporting the same.

2) Description of Related Art

Recently, research on an electronic device (e.g., a robot) capable of autonomous motion (or mobile type) has been conducted.

It can be useful to the operation of the electronic device capable of autonomous motion to recognize objects in its vicinity.

The above information is presented as background information only to assist with an understanding of the disclosure. No determination has been made, and no assertion is made, as to whether any of the above might be applicable as prior art with regard to the disclosure.

SUMMARY

An electronic device according to certain embodiments may include a camera, a memory, and at least one processor, wherein the at least one processor is configured to: obtain an image through the camera; obtain an image of at least one object from the obtained image; determine whether the image of the at least one object corresponds to an image of an object stored in the memory; output a request for information about the at least one object, based at least in part on the determination; and obtain the information about the at least one object, based at least in part on information received from an external source.

A method according to certain embodiments may include: obtaining an image through a camera; obtaining an image of at least one object from the obtained image; determining whether the image of the at least one object corresponds to an image of an object stored in a memory; outputting a request for information about the at least one object, based at least in part on the determination; and obtaining the information about the at least one object, based at least in part on information received from an external source.

According to certain embodiments, a method for monitoring an object and an electronic device for supporting the same can recognize a new object or accurately monitor an object incorrectly recognized due to a different shape or a location change.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an object list according to certain embodiments;

DETAILED DESCRIPTION

The electronic device may monitor a physical object around the electronic device while moving, and provide information on the monitored object to a user. In order to perform the monitoring operation, the electronic device may compare an image of an object obtained through a camera with an image of an object stored in a memory, so as to recognize (or identify) the object.

An electronic device may have difficulty in recognizing a new object, e.g., where the memory contains no information about the object. Additionally, the electronic device may have difficulty recognizing an object that has transformed its appearance, where the memory includes information about the object prior to transformation. Some examples can be an object that changes by itself, such as plant that grows, or an object that has several states, such as a box that is open or shut, to name a few. For example, when a user first brings an object (or an article) into a house or the object transforms, the electronic device may have difficulty in recognizing the object, since the memory has no information relating to and mapped to the object, or the object as it appears.

Certain embodiments relate to a method for monitoring an object and an electronic device for supporting the same, which can accurately recognize an object by obtaining information for recognizing the object through interaction (or conversation) with a user while the electronic device monitors the object in a house.

The technical subjects pursued in the disclosure may not be limited to the above mentioned technical subjects, and other technical subjects which are not mentioned may be clearly understood, through the following descriptions, by those skilled in the art of the disclosure.

Figure 1:
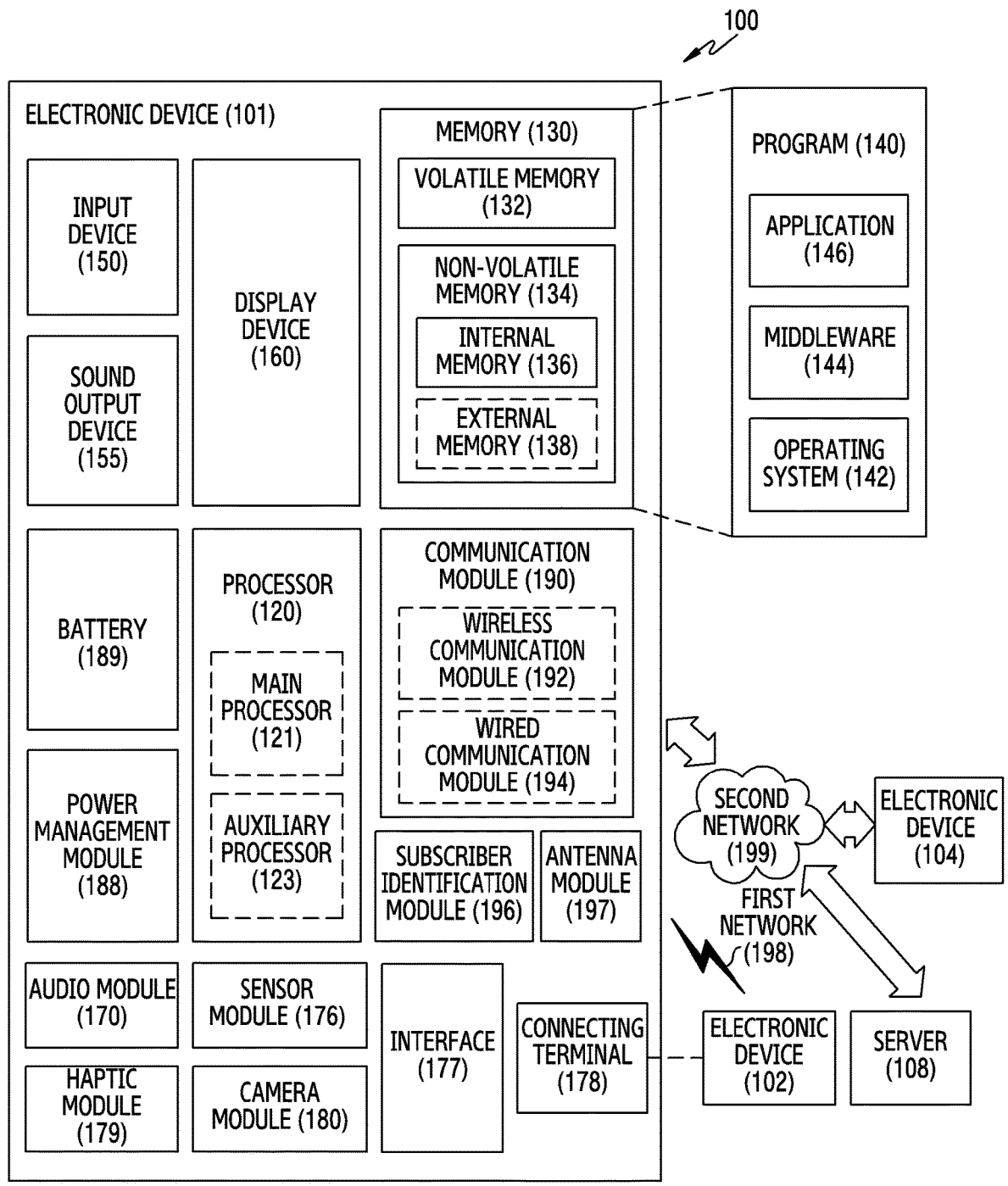
FIG. 1 is a block diagram of an electronic device within a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
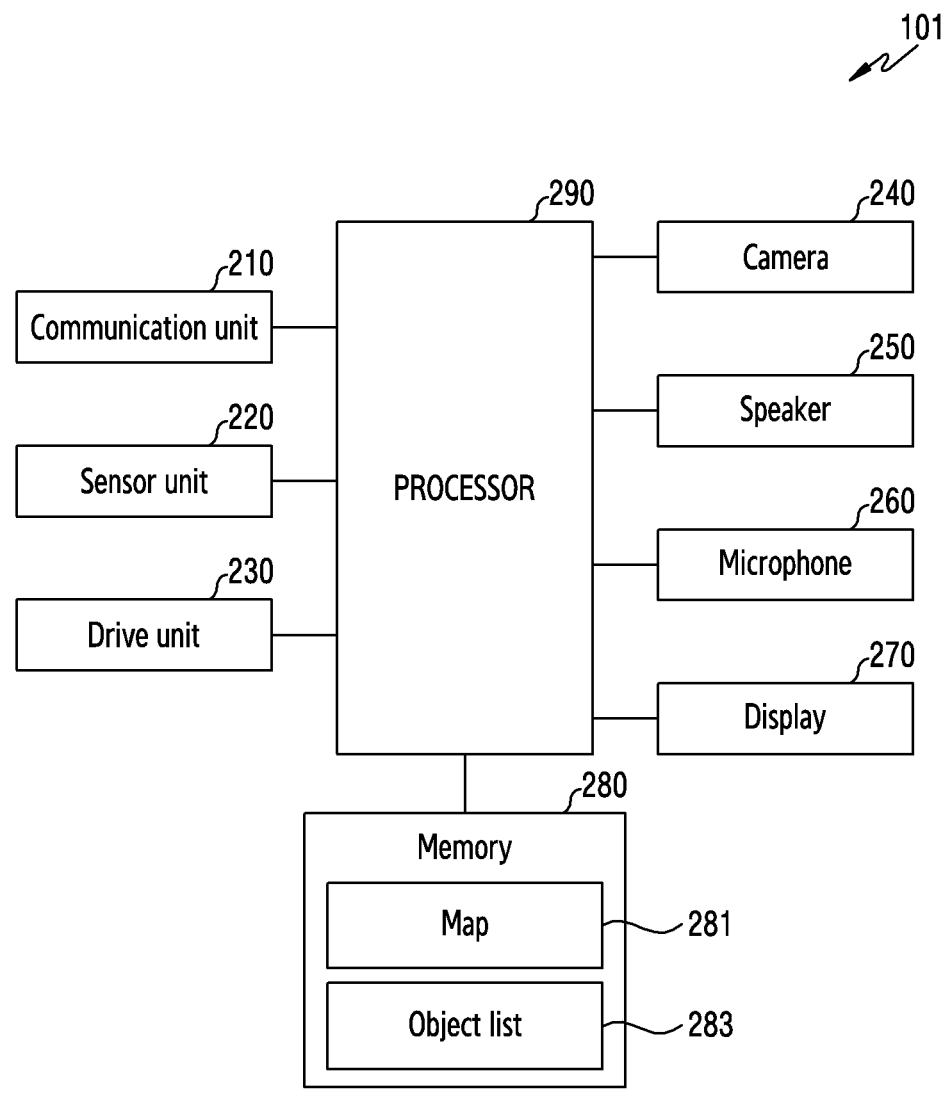
FIG. 2 illustrates an electronic device for monitoring an object according to certain embodiments.

FIG. 2 illustrates an electronic device 101 for monitoring an object according to certain embodiments.

Referring to FIG. 2, in an embodiment, the electronic device 101 may be an electronic device capable of autonomous motion, including, but not limited to, motion powered by electricity or hydrocarbons. In an embodiment, the electronic device 101 may be an electronic device capable of monitoring an object disposed in (or located in) a house.

In an embodiment, the electronic device 101 may include a communication unit 210, a sensor unit 220, a drive unit 230, a camera 240, a speaker 250, a microphone 260, a display 270, a memory 280, and a processor 290.

In an embodiment, the communication unit 210 may support communication between the electronic device 101 and an external electronic device (e.g., an electronic device 102 or 104). For example, the communication unit 210 may allow the electronic device 101 to communicate with a user's electronic device (e.g., a user's mobile phone) or a server (cloud server) (e.g., a server 108), an object located in a house. In an embodiment, the communication unit 210 may be at least partially identical or similar to a communication module 190 of FIG. 1.

In an embodiment, the sensor unit 220 may include at least one of a proximity sensor for detecting an object or a user, or a sensor (e.g., an acceleration sensor, a gyro sensor, or a geomagnetic sensor) for detecting movement and motion of the electronic device 101. In an embodiment, the sensor unit 220 may be at least partially identical or similar to a sensor module 176 of FIG. 1.

In an embodiment, the drive unit 230 may allow the electronic device 101 to move. In an embodiment, the drive unit 230 may have a shape which allows up/down/left/right or rotational movement around at least one axis, and may be variously implemented by combining a drive motor. In an embodiment, the shape of the drive unit 230 may be spherical. However, the disclosure is not limited thereto, and the drive unit 230 may be implemented in various ways or shapes in order to move the electronic device 101. In another embodiment, the drive unit 230 may be a plurality of rotatable blades that create thrust when rotated at a particular speed, such as with a drone.

In an embodiment, the camera 240 may photograph an object. For example, the camera 240 may photograph an object disposed in a house. In an embodiment, the camera 240 may be a depth camera or an RGB camera. In an embodiment, the camera 240 may be at least partially identical or similar to a camera module 180 of FIG. 1.

In an embodiment, the speaker 250 may output a sound related to an object to the outside. In an embodiment, the speaker 250 may be at least partially identical or similar to a sound output device 155 of FIG. 1.

In an embodiment, the microphone 260 may receive a sound from the periphery (e.g., a user) of the electronic device 101. In an embodiment, the microphone 260 may be at least partially identical or similar to an input device 150 of FIG. 1.

In an embodiment, the display 270 may display information related to an object. In an embodiment, the display 270 may be at least partially identical or similar to a display device 160 of FIG. 1.

In an embodiment, the memory 280 may store information related to an object. In an embodiment, the memory 280 may include a map 281 and an object list 283.

In an embodiment, the map 281 may be a map of a house where the electronic device 101 performs a monitoring operation for on an object. In an embodiment, the map 281 may be obtained (or generated) based on information obtained through the camera 240 or a sensor (e.g., an ultrasonic sensor or an infrared sensor) while the electronic device 101 autonomously drives in at least a part of the space of a house. However, a method for obtaining the map 281 is not limited to the above-described example. For example, the electronic device 101 may receive the map 281 of the house from an external electronic device (e.g., an electronic device 102 or 104) through the communication unit 210. In one embodiment, the electronic device 101 may obtain blueprints of the house from a web site maintained by, for example, a division of a municipality, which stores blueprints for all construction in the municipality.

In an embodiment, the object list 283 may include information on at least one object. In an embodiment, the object list 283 may include at least one of an image, a name, or a location of each of the at least one object.

In an embodiment, information on the at least one object included in the object list 283 may further include information (e.g., a flag) indicating whether it has been determined whether an object detected from an obtained image is identical to an object, information of which is stored in the memory 280. For example, when it is not determined (or decided) whether the object detected from the currently obtained image is the same as or different from an object, information of which is stored in the object list 283, a flag may be configured to "1". When it is determined that the object detected from the currently obtained image is the same as or different from the object, information of which is stored in the object list 283, the flag may be configured to "0".

In an embodiment, the object list 283 may include a history of a state of at least one object. For example, the object list 283 may cumulatively include information on a location of the at least one object for each time point at which an image of the at least one object is obtained. In an embodiment, a frequency (or number of times) by which the location of the at least one object changes within a predetermined time may be determined based at least in part on the information on the location of the at least one object cumulatively included in the object list 283. In an embodiment, the user's preference for the at least one object and a pattern (or a user's life pattern) of using the at least one object may be determined based at least in part on the frequency by which the location of the at least one object changes within the predetermined time (or period).

In an embodiment, the memory 280 may further include various information in addition to the map 281 and the object list 283. In an embodiment, the memory 280 may further include information about a person in a house. For example, the memory 280 may accumulatively store information about a location (or location change) of a specific person while the electronic device 101 performs a monitoring operation. For another example, the memory 280 may store profile information relating to members of the house. The memory 280 may store that the members of the house are user A, user B, and user C. However, information that the memory 280 may store in addition to the map 281 and the object list 283 is not limited to the above-described example, which will be described later in detail. The memory 280 may be at least partially identical or similar to a memory 130 of FIG. 1.

In an embodiment, the processor 290 may be at least partially identical or similar to a processor 120 of FIG. 1. In an embodiment, the processor 290 may control the overall operation of monitoring an object. The operation of monitoring the object by the processor 290 will be described in detail with reference to FIG. 3 below.

In an embodiment, the electronic device 101 may not include a part of the configurations shown in FIG. 2, and may further include a part of the configurations of the electronic device 101 of FIG. 1.

An electronic device 101 according to certain embodiments may include a camera 240, a memory 280, and at least one processor 290, wherein the at least one processor 290 is configured to: obtain an image through the camera 240; obtain an image of at least one object from the obtained image; determine whether the image of the at least one object corresponds to an image of an object stored in the memory 280; output information for inquiring about information on the at least one object, based at least in part on the determination; and obtain the information on the at least one object, based at least in part on information received from the outside.

In certain embodiments, when it is determined that the image of the at least one object does not correspond to the image of the object stored in the memory 280, the at least one processor 290 may be configured to output information for inquiring about information on the at least one object.

In certain embodiments, the electronic device 101 may further include a speaker 250 and a microphone 260, and the at least one processor 290 may be configured to output the information for inquiring about the information on the at least one object, through the speaker 250, and obtain the information on the at least one object, based at least in part on information received through the microphone 260.

In certain embodiments, the electronic device 101 may further include a display 270, and the at least one processor may be configured to output the information for inquiring about the information on the at least one object, through the display 270, and obtain the information on the at least one object, based at least in part on information received from the outside.

In certain embodiments, the electronic device 101 may further include a communication unit 210, and the at least one processor 290 may be configured to, through the communication unit 210, transmit the information for inquiring about the information on the at least one object to an external electronic device (e.g., an electronic device 102 or 104) so as to allow the external electronic device to output the information for inquiring about the information on the at least one object, and obtain the information on the at least one object, based at least in part on information received from the external electronic device through the communication unit 210.

In certain embodiments, the at least one processor 290 may be configured to: when the at least one object is not the same as an object stored in the memory 280, register the information on the at least one object in the memory 280; and when the at least one object is the same as the object stored in the memory 280, update information on the object stored in the memory 280 by using the information on the at least one object.

In certain embodiments, the at least one processor 290 may be configured to obtain an image of a plurality of objects from the image and store a relation between at least two objects among the plurality of objects, so as to associate the at least two objects.

In certain embodiments, the electronic device 101 may further include a display 270, and the at least one processor 290 may be configured to display a guide for allowing selection of each of image portions of the plurality of objects, through the display 270, and associate at least two objects, based at least in part on an input for selecting image portions of the at least two objects from among the image portions of the plurality of objects.

In certain embodiments, when the relation between the at least two objects is changed, the at least one processor 290 may be configured to perform a function corresponding to the changed relation.

In certain embodiments, the at least one processor 290 may be configured to determine a priority between a plurality of objects stored in the memory 280, and configure an operation for monitoring one or more objects among the plurality of objects, based at least in part on the priority.

In certain embodiments, the at least one processor 290 may be configured to, based at least in part on the priority, configure at least one of a path in which the electronic device 101 moves, a period for monitoring the one or more objects, or a monitoring range.

Figure 3:
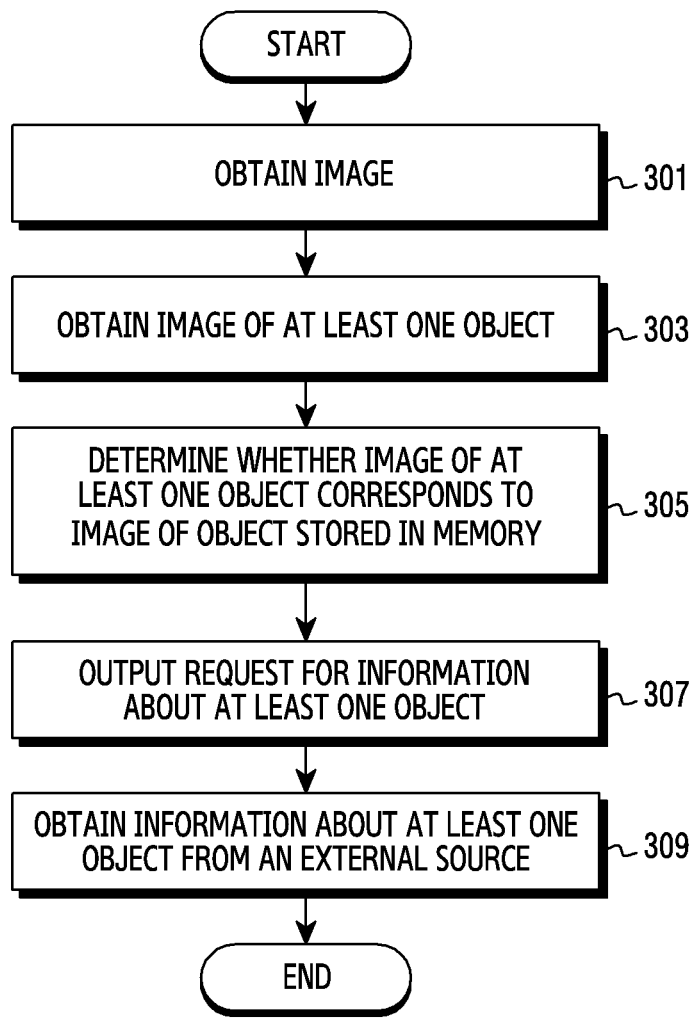
FIG. 3 is a flowchart illustrating a method for monitoring an object according to certain embodiments.

FIG. 3 is a flowchart illustrating a method for monitoring an object according to certain embodiments.

Referring to FIG. 3, in operation 301, a processor 290 may obtain an image by using a camera 240.

In an embodiment, while an electronic device 101 monitors at least one object disposed in a house, based at least in part on of a map 281 (or travels in a space in the house), the processor 290 may photograph the at least one object disposed in the house by using the camera 240. The processor 290 may receive an image including an image of the at least one object from the camera 240.

In operation 303, the processor 290 may obtain the image of the at least one object from the obtained image. In an embodiment, when the obtained image of the at least one object includes a background and the image of the at least one object (or an image portion indicating the at least one object within the obtained image), the processor 290 may detect (or extract, or separate) the image of the at least one object from the background in the obtained image.

In operation 305, the processor 290 may determine whether the obtained image of the at least one object corresponds to an image of an object identified or described in the memory 280, such as included in the object list.

In an embodiment, the processor 290 may identify an image of an object most similar to the obtained image of the at least one object, among an image of at least one object stored in the memory 280 (or an object list 283) (hereinafter, referred to as an "image of the most similar object").

In an embodiment, when the similarity between the obtained image of the at least one object and the image of the most similar object is greater than or equal to a designated threshold value, the processor 290 may determine that the obtained image of the at least one object corresponds to the image of the most similar object. In an embodiment, when it is determined that the obtained image of the at least one object corresponds to the image of the most similar object, the processor 290 may determine that the at least one object is the same as the object of the image of the most similar object. In an embodiment, when it is determined that the at least one object is the same as the object of the image of the most similar object, the processor 290 may store information on a location of the at least one object in the memory 280 (or update the most recent location of the object of the image of the most similar object with the information on the location of the at least one object). In an embodiment, when it is determined that the at least one object is the same as the object of the image of the most similar object, the processor 290 may store the image of the at least one object in the memory 280 together with the information on the location of the at least one object. For example, when it is determined that the at least one object is the same as the object of the image of the most similar object, the processor 290 may associate (or map) information on the object of the image of the most similar object, and thus store the obtained image of the at least one object and the information on the location of the at least one object in the memory 280.

In an embodiment, when the similarity between the obtained image of the at least one object and the image of the most similar object is less than the designated threshold value, the processor 290 may determine that the obtained image of the at least one object does not correspond to the image of the most similar object. In an embodiment, when it is determined that the obtained image of the at least one object does not correspond to the image of the most similar object, the processor 290 may determine that it is not determined whether the obtained at least one object is the same as an object, information of which is stored in the memory 280 (or the object list 283). In an embodiment, when it is determined that the obtained image of the at least one object does not correspond to the image of the most similar object, the processor 290 may determine there is no information about the object in the memory (hereinafter, referred to as an "unknown object").

In an embodiment, when it is determined that the obtained at least one object is an unknown object, the processor 290 may configure a flag value indicating that the obtained at least one object is an unknown object, together with the location of the obtained at least one object and the obtained image of the at least one object. In FIG. 4 below, the object list 283 to be stored will be described based at least in part on whether the image of the at least one object corresponds to the image of the object stored in the memory 280.

FIG. 4 is a diagram illustrating an object list 283, according to certain embodiments.

Referring to FIG. 4, in an embodiment, the object list 283 may include, with respect to each of a plurality of objects, an image of an object, a name (or a unique identity (ID)) for distinguishing the object from another object, a location of the object, and a flag value indicating whether the object is a known object.

In an embodiment, the object list 283 may include, for example, with respect to object A, an image 411 of the object A, a name of the object A (e.g., user A's mobile phone), a location of the object A (e.g., on a bed in room 1), and a flag value (e.g., "0") indicating that the object A is not an unknown object.

In an embodiment, the object list 283 may include, for example, with respect to object B, an image 413 of the object B, a location of the object B (e.g., on a sofa in a living room), and a flag value (e.g., "1") indicating that the object B is an unknown object. In an embodiment, when it is determined that the object B is an unknown object, the object list 283 may not include a name of the object B, or may include a type of object B (e.g., a car key) as the name of the object B.

In an embodiment, the object list 283 may include, for example, with respect to object C, an image 415 of the object C, a name of the object C (e.g., a garbage can in a main room), a location of the object C (e.g., next to a desk in room 2), and a flag value (e.g., "0") indicating that the object C is not an unknown object.

In an embodiment, the object list 283 may include a history of a state of at least one object. For example, the object list 283 may cumulatively include information on a location of the at least one object for each time point at which an image of the at least one object is obtained. In an embodiment, a processor 290 may determine a frequency (or number of times) by which the location of the at least one object changes within a predetermined time, based at least in part on the information on the location of the at least one object cumulatively included in the object list 283. In an embodiment, the processor 290 may determine the user's preference for the at least one object and a pattern (or a user's life pattern) of using the at least one object, based at least in part on the frequency by which the location of the at least one object changes within the predetermined time.

Returning to FIG. 3, in operation 307, the processor 290 may perform request information about the at least one object, when it is determined that the image of the at least one object does not correspond to the image of the object stored in the memory 280.

In an embodiment, the processor 290 may output a sound alert for requesting the information about the at least one object, through a speaker 250. In an embodiment, the processor 290 may output a request for the information about the at least one object through a display 270. For example, the processor 290 may output, through the display 270, information indicating that the at least one object is an unknown object (e.g., the object list 283 including information indicating that the obtained at least one object is an unknown object). However, a method for inquiring of a user about information on at least one object is not limited to the above-described example.

In an embodiment, the processor 290 may move the electronic device 101 to a user's location, and then output request to the user to provide the information about the at least one object. For example, the processor 290 may identify the user's location stored in the memory 280. The processor 290 may control the drive unit 230 such that the electronic device 101 moves to the user's location. When the electronic device 101 moves to the user's location, the processor 290 may output a request to the user for the information about the at least one object.

In an embodiment, when a user approaches the electronic device 101, the processor 290 may output the request to the user to provide information about the at least one object. For example, after the at least one object is determined as an unknown object, the processor 290 may perform a monitoring operation for another object, based at least in part on a designated path. The processor 290 may detect that the user has approached the electronic device 101 while performing the monitoring operation for another object. The processor 290 may output the request to the user for information about the at least one object, in response to the user's proximity to the electronic device 101.

In an embodiment, the processor 290 may control another electronic device (e.g., an electronic device 102 or 104) such that another electronic device 101 outputs the request for the information about the at least one object. For example, the processor 290 may transmit, by using the communication unit 210, information related to the request for the information about the at least one object to another electronic device 101 such that another electronic device (e.g., a user's mobile phone) outputs the request for the information about the at least one object.

In an embodiment, the processor 290 may transmit the request for the information about the at least one object to a server (e.g., a server 108) (e.g., a cloud server).

In operation 309, the processor 290 may obtain the information about the at least one object, based at least in part on information received externally from the electronic device.

In an embodiment, the processor 290 may obtain the information about the at least one object, based at least in part on an input (e.g., a sound) received from a user through the microphone 260. In an embodiment, the processor 290 may obtain the information on the at least one object, through the communication unit 210, based at least in part on information received through at least one of another electronic device 101 or the server. In an embodiment, the information received through at least one of another electronic device 101 or the server may include a response to the information for inquiring about the information on the at least one object, which has been input to another electronic device 101 or transmitted to the server by the user.

In an embodiment, the information received from the outside may include information obtained by selection of a screen menu by a user. The screen menu may include information on an object previously registered in the electronic device 101 or may be configured based on information received from an external device (e.g., a server) or the Internet.

In an embodiment, based at least in part on the information received from the outside, the processor 290 may obtain information indicating that the at least one object is an object (or an object newly disposed in a house) different from an object, information of which is stored in the memory 280.

In an embodiment, when the processor 290 obtains the information indicating that the at least one object is the object different from the object, information of which is stored in the memory 280, the processor 290 may newly include (or register) information on the at least one object in the object list 283. For example, when the processor 290 obtains the information indicating that the at least one object is the object different from the object, information of which is stored in the memory 280, the processor 290 may store (or update) the object list 283 including an image of the at least one object, a name of the at least one object (e.g., user B's car key), a location (or current location) of the at least one object, and a flag value indicating that the at least one object is not an unknown object (or it is determined that the at least one object is the object different from the object, information of which is stored in the memory 280).

In an embodiment, when the processor 290 obtains the information indicating that the at least one object is the object different from the object, information of which is stored in the memory 280, and the at least one object satisfies a designated condition, the processor 290 may include information on the at least one object in the object list 283. For example, when an owner of at least one object corresponds to a designated user (e.g., a member of a house), the processor 290 may include information on the at least one object in the object list 283. In another example, when the owner of the at least one object does not correspond to the designated user (e.g., a friend who visits the house), the processor 290 may not include the information on the at least one object in the object list 283. In an embodiment, when the at least one object does not satisfy the designated condition, the processor 290 may not perform a monitoring operation for the at least one object which does not satisfy the condition.

In an embodiment, the processor 290 may obtain information indicating that the at least one object is the same as the object, information of which is stored in the memory 280 (or an object previously disposed in the house), based at least in part on information received from the outside. In an embodiment, the case where the at least one object is the same as the object, information of which is stored in the memory 280 may correspond to the case where the same object is photographed at different angles (or directions), and thus the obtained image of the at least one object is different from the image of the object, which has been stored in the memory 280 at the time of obtaining the image of the at least one object. In an embodiment, the processor 290 may update the object list 283 when the processor 290 obtains information indicating that the at least one object is the same as the object, information of which is stored in the memory 280. In an embodiment, when the processor 290 obtains information indicating that the at least one object is the same as the object, information of which is stored in the memory 280, the processor 290 may store (or update) an image of the at least one object (e.g., images of the same object obtained at different angles), information on a location of the at least one object (or information on the object, information of which is stored in the memory 280, the object being the same as the at least one object), and a flag value indicating that the at least one object is not an unknown object (or it is determined that that at least one object is the same as the object, information of which is stored in the memory 280).

In an embodiment, although not shown in FIG. 3, the processor 290 may repeatedly perform operations 301 to 309 while monitoring at least a part of at least one object disposed in a house, based at least in part on the map 281.

Figure 5:
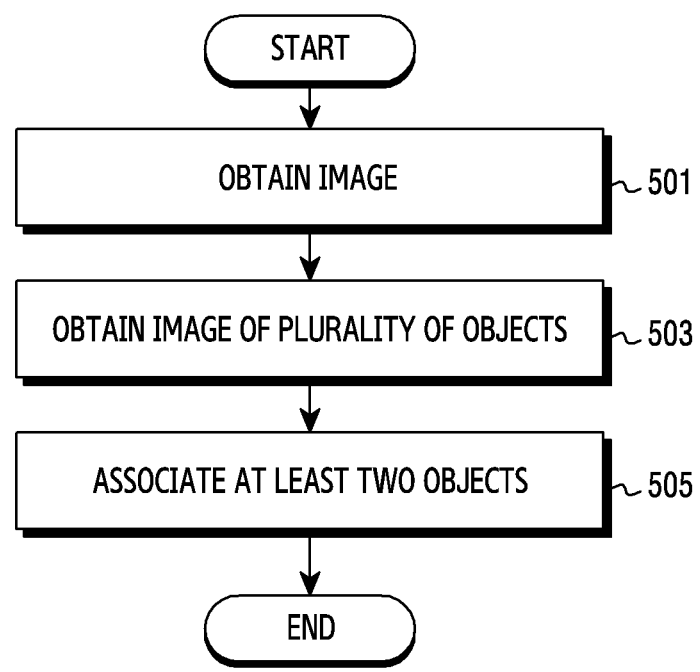
FIG. 5 is a flowchart illustrating a method for designating, as a monitoring target, a plurality of objects by an electronic device, according to certain embodiments.

FIG. 5 is a flowchart illustrating a method for designating, as a monitoring target, a plurality of objects by an electronic device 101, according to certain embodiments.

Referring to FIG. 5, in operation 501, a processor 290 may obtain an image by using a camera 240.

In an embodiment, while the electronic device 101 monitors at least one object disposed in a house, based at least in part on a map 281, the processor 290 may photograph the object disposed in the house by using the camera 240. The processor 290 may receive an image including an image of the at least one object from the camera 240.

In operation 503, the processor 290 may obtain an image of a plurality of objects from the obtained image. In an embodiment, when the obtained image of the plurality of objects includes a background and the plurality of objects, the processor 290 may detect (or extract, or separate) the image of the plurality of objects (or an image portion of each of the plurality of objects within the obtained image) from the background in the obtained image.

In operation 505, the processor 290 may associate at least two objects among the plurality of objects.

In an embodiment, the processor 290 may determine the at least two objects as objects to be associated with each other, based at least in part on a relation between the plurality of objects (e.g., a location relation between the plurality of objects (or a state in which the plurality of objects are placed)). In an embodiment, the processor 290 may determine, as objects to be associated with each other, at least two objects which are disposed within a designated distance or in contact with each other among the plurality of objects. For example, when a first object (e.g., an artificial intelligence (AI) speaker) among the plurality of objects is placed on a second object (e.g., a table), the processor 290 may determine the first object and the second object as objects to be associated with each other. In another example, when the first object (e.g., a character doll) among the plurality of objects is located within a designated distance (e.g., about 30 cm) from the second object (e.g., an AI speaker), the processor 290 may determine the first object and the second object as objects to be associated with each other.

In an embodiment, each of at least two objects to be associated with each other may be an object, information of which is stored in a memory 280, or an unknown object.

In an embodiment, the processor 290 may designate the at least two objects to be associated with each other as one object (or one model). In an embodiment, when the at least two objects to be associated with each other are designated as one object, the processor 290 may store, in memory 280, a relation between the at least two objects designated as one object (hereinafter, referred to as "at least two designated objects") and an image of the at least two designated objects (or an image including an image portion of each of the at least two designated objects).

In an embodiment, without storing the image of the at least two objects to be associated with each other in memory 280, the processor 290 may store a relation between the at least two objects to be associated with each other in the memory 280 so as to correspond to (or map) information on each of the at least two objects to be associated with each other.

In an embodiment, when at least two objects among the plurality of objects are associated with each other, the processor 290 may designate (or include) a relation between the at least two associated objects as a monitoring target.

Figure 6:
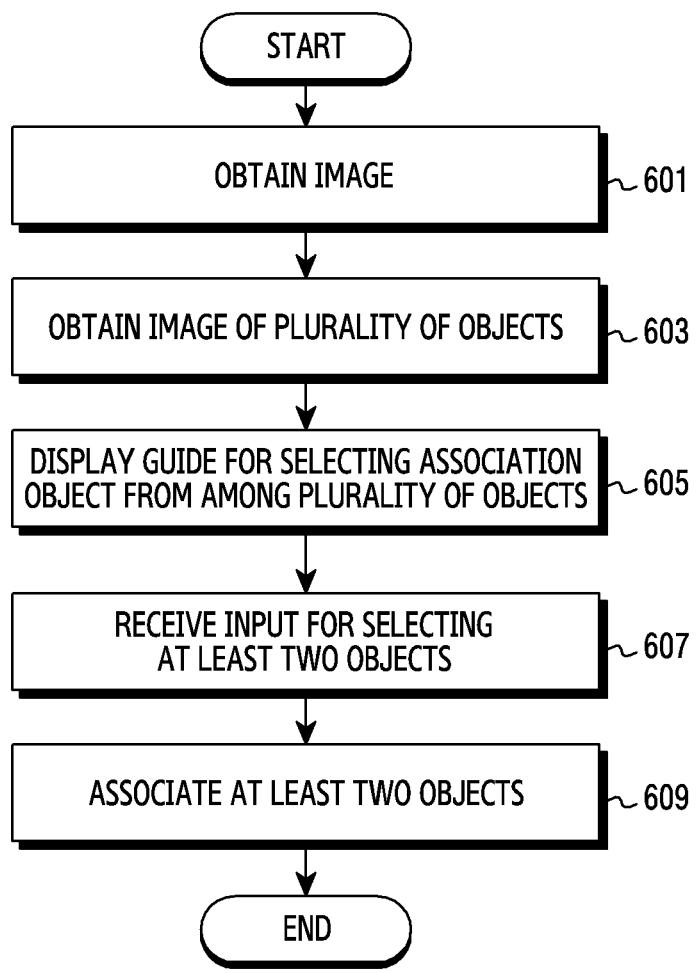
FIG. 6 is a flowchart illustrating a method for designating a plurality of objects as a monitoring target, based on a user input, according to certain embodiments.

FIG. 6 is a flowchart illustrating a method for designating a plurality of objects as a monitoring target, based on a user input, according to certain embodiments.

Referring to FIG. 6, in operation 601, a processor 290 may obtain an image by using a camera 240.

In an embodiment, while an electronic device 101 monitors at least one object disposed in a house, based at least in part on a map 281, the processor 290 may photograph the object disposed in the house by using the camera 240. The processor 290 may receive an image including an image of the at least one object from the camera 240.

In operation 603, the processor 290 may obtain an image of a plurality of objects from the obtained image. In an embodiment, when the obtained image of the plurality of objects includes a background and the plurality of objects, the processor 290 may detect (or extract, or separate) the image of the plurality of objects (or an image portion of each of the plurality of objects within the obtained image) from the background in the obtained image.

In operation 605, the processor 290 may display, through a display 270, a guide for selecting (or identifying) an association object among the plurality of objects.

In an embodiment, the processor 290 may display, through the display 270, an indication which allows identification and selection of an image portion of each of the plurality of objects, within the image of the plurality of objects. For example, the processor 290 may display or highlight a guide line for a region including the image portion of each of the plurality of objects, through the display 270, so as to select the image portion of each of the plurality of objects, within the image of the plurality of objects. However, the indication which allows selection of the image portion of each of the plurality of objects is not limited to the above-described example.

In an embodiment, operation 605 is described as displaying the guide for selecting the association object among the plurality of objects through the display 270, but the disclosure is not limited thereto. For example, the processor 290 may output a sound for selecting, by a user, the association object among the plurality of objects, through a speaker 250.

In an embodiment, operation 605 may be omitted. For example, when the processor 290 can receive, from a user, an input for selecting the image portion (or region) of each of the plurality of objects (e.g., an input of touching the image portion of each of the plurality of objects), without displaying the guide for selecting the association object among the plurality of objects, the displaying of the guide of operation 605 may be omitted.

In operation 607, the processor 290 may receive, from a user, an input for selecting at least two objects to be associated with each other. For example, the processor 290 may receive a user input on a region within the guide line (e.g., an input of touching the region within the guide line). For another example, the processor 290 may receive, from a user, a sound for selecting an association object, through a microphone 260. For another example, the processor 290 may receive, from a user, a user input on an image portion of each of objects to be associated with each other. However, a user input for selecting at least two objects to be associated with each other is not limited to the above-described example.

In operation 609, the processor 290 may associate at least two objects among the plurality of objects.

In an embodiment, operation 609 is at least partially identical or similar to operation 505 of FIG. 5, and thus detailed description thereof will be omitted.

In an embodiment, FIG. 6 illustrates the displaying of the guide for selecting the association object from among the plurality of objects, through the display 270 of the electronic device 101, and the receiving of, from the user, the input for selecting the at least two objects to be associated with each other, but the disclosure is not limited thereto. For example, the electronic device 101 may control another electronic device (e.g., a user's mobile phone) to display the guide for selecting the association object from among the plurality of objects, and receive information on the user input for selecting the at least two objects to be associated with each other from the another electronic device.

Figure 7:
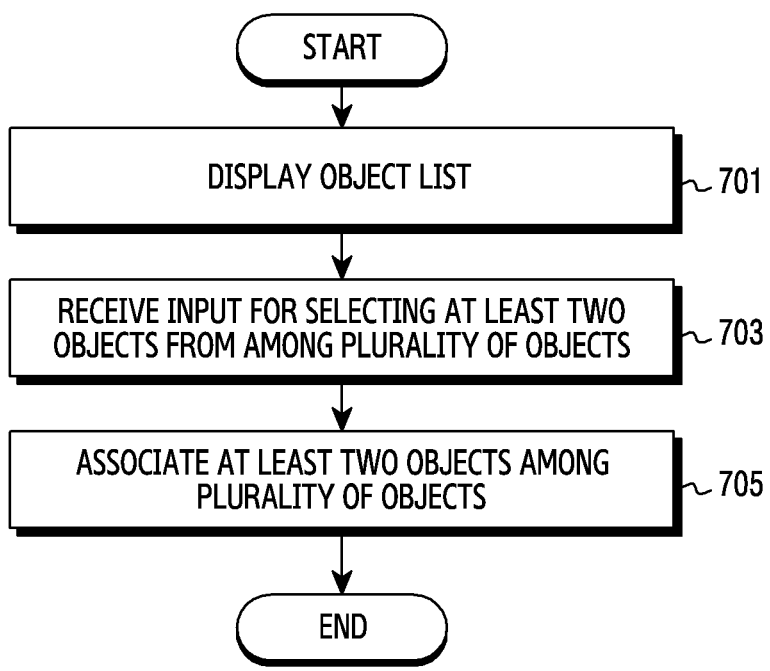
FIG. 7 is a flowchart illustrating a method for designating a plurality of objects as a monitoring target, based on an object list, according to certain embodiments.

FIG. 7 is a flowchart illustrating a method for designating a plurality of objects as a monitoring target, based on an object list 283, according to certain embodiments.

Referring to FIG. 7, in operation 701, a processor 290 may display the object list 283 including information on a plurality of objects by using a display 270. In an embodiment, the processor 290 may control another electronic device (e.g., a user's mobile phone) to display the object list 283 including the information on the plurality of objects.

In operation 703, the processor 290 may receive an input for selecting at least two objects among the plurality of objects. In an embodiment, the processor 290 may use a communication unit 210 to receive, from another electronic device, information indicating that the at least two objects among the plurality of objects are selected.

In operation 705, the processor 290 may associate the at least two selected objects.

In an embodiment, when the at least two selected objects satisfy a designated relation, the processor 290 may configure control information for allowing at least one of the at least two selected objects to execute a designated function. For example, when the at least two selected objects, for example, a first object (e.g., a character doll) and a second object (e.g., an AI speaker) are located within a designated distance, the processor 290 may configure information for allowing the first object to control the second object such that the second object executes a designated function (or a function related to the first object) (e.g., playing music related to the character). For another example, when a first object (e.g., an AI speaker) is placed on a second object (e.g., a table), the processor 290 may configure information for controlling the first object such that the first object executes a designated function (e.g., playing music). However, when the at least two selected objects satisfy the designated relation, a method for configuring control information for allowing at least one of the at least two selected objects to execute a designated function is not limited to the above-described example.

Although not shown in FIG. 7, in an embodiment, in operation 703, when the at least two selected objects satisfy the designated relation, the processor 290 may receive, from a user, an input for configuring a function to be executed by at least one of the at least two selected objects, together with the input for selecting the at least two objects from among the plurality of objects.

Figure 8:
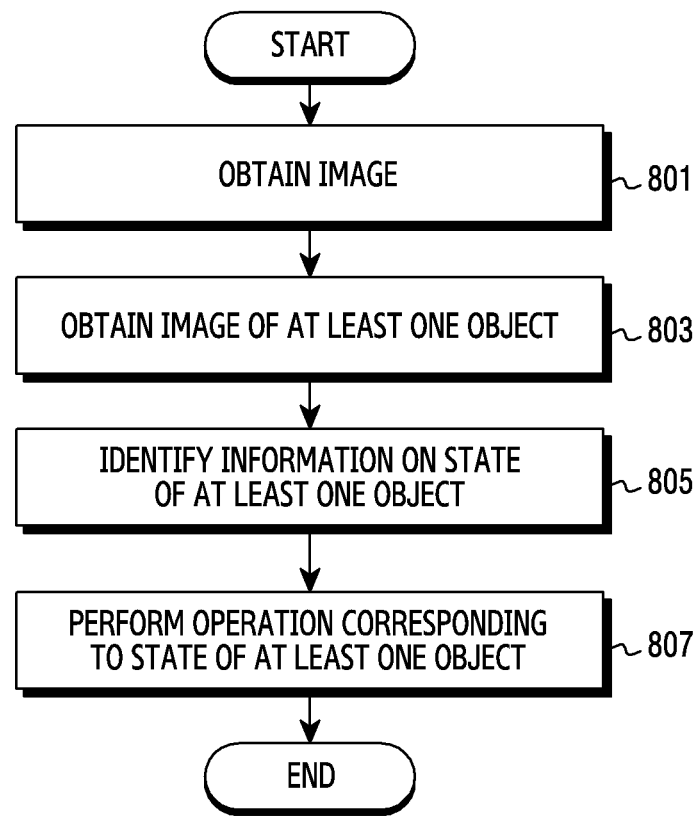
FIG. 8 is a flowchart illustrating a method for performing an operation corresponding to a state of at least one object, according to certain embodiments.

FIG. 8 is a flowchart illustrating a method for performing an operation corresponding to a state of at least one object, according to certain embodiments.

Referring to FIG. 8, in operation 801, a processor 290 may obtain an image through a camera 240.

In an embodiment, while an electronic device 101 monitors at least one object disposed in a house, based at least in part on a map 281, the processor 290 may photograph the at least one object disposed in the house by using a camera 240. The processor 290 may receive an image including an image of the at least one object from the camera 240.

In operation 803, the processor 290 may obtain the image of the at least one object from the obtained image. In an embodiment, when the obtained image of the at least one object includes a background and the image of the at least one object, the processor 290 may detect the image of the at least one object from the background in the obtained image.

In operation 805, the processor 290 may identify information on a state of the at least one object.

In an embodiment, the processor 290 may identify information on the same object as the at least one object in an object list 283, based at least in part on the obtained image of the at least one object.

In an embodiment, the processor 290 may compare a current location of the at least one object with a location of the at least one object stored in the object list 283, so as to identify information on whether the location of the at least one object has changed.

In an embodiment, based at least in part on the image of the at least one object, the processor 290 may identify information on whether an operation state (e.g., a turn-on state or a turn-off state) of the at least one object (e.g., a television) has changed.

However, the information on the state of the at least one object is not limited to the above-described information on the location or operation state of the at least one object.

In operation 807, the processor 290 may perform an operation corresponding to the state of the at least one object.

In an embodiment, when the state of the at least one object is changed, the processor 290 may output information indicating that the state of the at least one object is changed. For example, when the state of the at least one object is changed, the processor 290 may display information indicating that the state of the at least one object is changed, through a display 270. For another example, when the state of the at least one object is changed, the processor 290 may output, as a sound, information indicating that the state of the at least one object is changed, through a speaker 250.

In an embodiment, when the state of the at least one object is changed, the processor 290 may control another electronic device (e.g., a user's mobile phone) to output information indicating that the state of the at least one object is changed.

In an embodiment, when the state of the at least one object is changed, the processor 290 may control the at least one object such that the at least one object performs a designated function. For example, when an object (e.g., an AI speaker) moves to a first location in a house, the processor 290 may control the object such that the object executes a function (e.g., playing music of a classical genre) corresponding to the first location. For another example, when the object (e.g., an AI speaker) moves to a second location in the house, the processor 290 may control the object such that the object executes a function (e.g., playing music of a ballad genre) corresponding to the second location.

Figure 9:
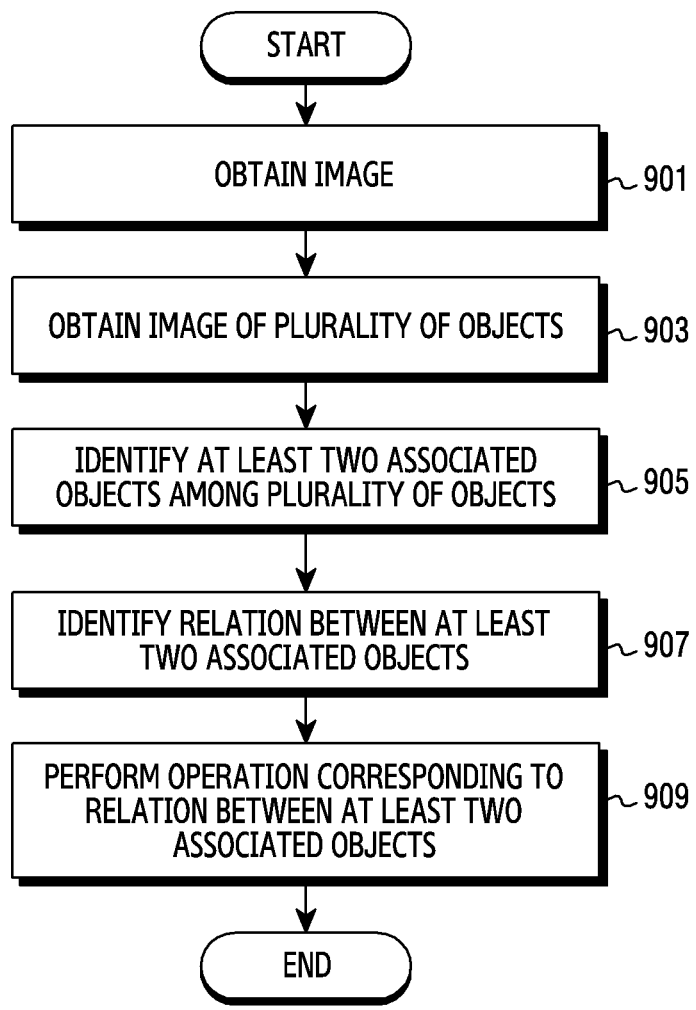
FIG. 9 is a flowchart illustrating a method for performing an operation corresponding to a relation between a plurality of objects designated as a monitoring target, according to certain embodiments.

FIG. 9 is a flowchart illustrating a method for performing an operation corresponding to a relation between a plurality of objects designated as a monitoring target, according to certain embodiments.

Referring to FIG. 9, in operation 901, a processor 290 may obtain an image through a camera 240.

In an embodiment, while an electronic device 101 monitors at least one object disposed in a house, based at least in part on a map 281, the processor 290 may photograph the at least one object disposed in the house by using the camera 240. The processor 290 may receive an image including an image of the at least one object from the camera 240.

In operation 903, the processor 290 may obtain an image of a plurality of objects from the obtained image. In an embodiment, when the obtained image of the plurality of objects includes a background and the image of the plurality of objects, the processor 290 may detect an image of each of the plurality of objects from the background in the obtained image.

In operation 905, the processor 290 may identify at least two associated objects among the plurality of objects, based at least in part on the image of the plurality of objects. For example, the processor 290 may compare the image of each of the plurality of objects with an image of an object stored in an object list 283, and thus identify at least two objects, the relation between which has been stored.

In operation 907, when the processor 290 identifies the at least two associated objects among the plurality of objects, the processor 290 may identify a relation between the at least two associated objects. In an embodiment, the processor 290 may determine whether the relation between the at least two associated objects has changed. For example, the processor 290 may determine whether a location relation between the at least two objects (or a state in which the at least two objects are placed) has changed.

In operation 909, the processor 290 may perform an operation corresponding to the relation between the at least two associated objects.

In an embodiment, when the relation between the at least two objects is changed, the processor 290 may output information indicating that the relation between the at least two objects is changed. For example, when the relation between the at least two objects is changed, the processor 290 may display, through a display 270, information indicating that the relation between the at least two objects is changed. For another example, when the relation between the at least two objects is changed, the processor 290 may output, as a sound, information indicating that the relation between the at least two objects is changed, through a speaker 250.

In an embodiment, when the relation between the at least two objects is changed, the processor 290 may control another electronic device 101 such that another electronic device (e.g., a user's mobile phone) outputs information indicating that the relation between the at least two objects is changed.

In an embodiment, when the relation between the at least two objects is changed, the processor 290 may control at least one of the at least two objects to perform a designated function. For example, when a first object (e.g., an AI speaker) moves onto a second object (e.g., a table), the processor 290 may control the first object to execute a designated function (e.g., playing music). In another example, when a first object (e.g., a character doll) is moved within a designated distance from a second object (e.g., an AI speaker), the processor 290 may allow the first object to control the second object such that the second object executes a designated function (or a function related to the first object) (e.g., playing music related to the character).

Figure 10:
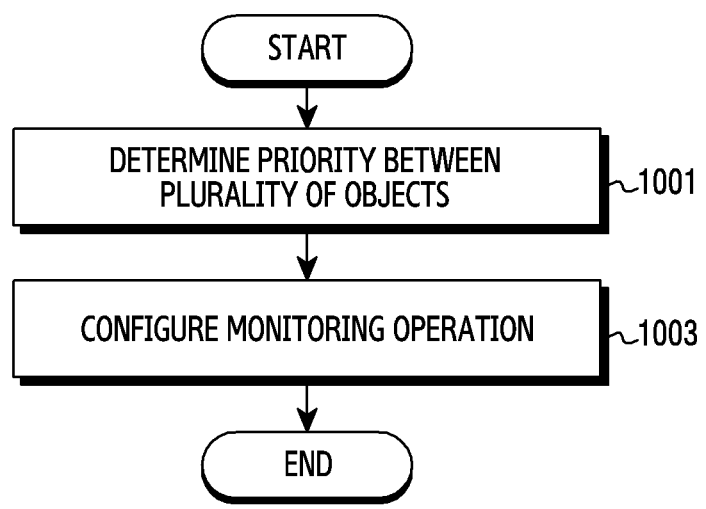
FIG. 10 is a flowchart illustrating a method for configuring a monitoring operation according to a priority of an object, according to certain embodiments.

FIG. 10 is a flowchart illustrating a method for configuring a monitoring operation according to a priority of an object, according to certain embodiments.

Referring to FIG. 10, in operation 1001, a processor 290 may determine a priority between a plurality of objects.

In an embodiment, the processor 290 may identify a history of a state of at least one object, so as to determine the priority between the plurality of objects. In an embodiment, the processor 290 may identify a frequency (or number of times) by which a location of the at least one object changes within a predetermined time (or period), based at least in part on information on the location of the at least one object cumulatively included in the object list 283. The processor 290 may determine (or assign) a high priority with respect to an object having a high frequency by which a location of the object changes within a predetermined time. In an embodiment, the higher the frequency by which the location of at least one object changes within a predetermined time (or period), the higher the preference a user may have for the object.

In an embodiment, the processor 290 may determine the priority between the plurality of objects, based at least in part on a user input.

In an embodiment, the processor 290 may determine the priority between the plurality of objects, based at least in part on functions of the objects. For example, the processor 290 may determine a high priority with respect to an object (e.g., a mobile phone) which can communicate with an electronic device 101, and determine a low priority with respect to an object (e.g., a table) which cannot communicate with the electronic device 101.

In operation 1003, the processor 290 may configure an operation for monitoring the objects, based at least in part on the priority with respect to the objects.

In an embodiment, the processor 290 may configure a period for monitoring the objects, based at least in part on the priority with respect to the objects. For example, the processor 290 may configure a short monitoring period (e.g., one hour) with respect to an object having a high priority. For another example, with respect to an object having a low priority, the processor 290 may configure a long period (e.g., one day) of monitoring the object.

In an embodiment, the processor 290 may configure a movement path of the electronic device 101 which monitors the objects, based at least in part on the priority with respect to the objects. For example, the processor 290 may configure a movement path in which the electronic device 101 moves, so as to allow the electronic device 101 to monitor the objects in order from the highest priority object to the lowest priority object. For another example, the processor 290 may configure a movement path in which the electronic device 101 moves to monitor from a place where an object having a high priority is located to a place where an object having a low priority is located.

In an embodiment, the processor 290 may configure a monitoring range, based at least in part on the priority for the objects. For example, the processor 290 may configure a monitoring range to allow the electronic device to monitor, with respect to an object having a high priority, a space around the object in addition to the object and monitor, with respect to an object having a low priority, only the object.

Figure 11:
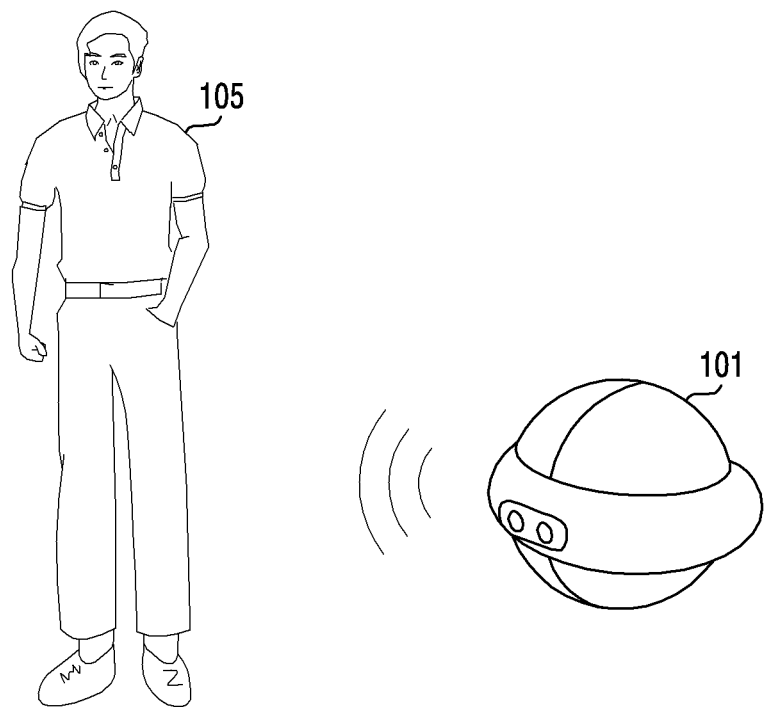
FIG. 11 is an exemplary diagram illustrating a method for monitoring an object according to certain embodiments.

FIG. 11 is an exemplary diagram illustrating a method for monitoring an object according to certain embodiments.

Referring to FIG. 11, in an embodiment, when the electronic device 101 does not recognize an object in an image captured by its camera, the electronic device may output a request for information about the object from a user. The electronic device 101 may not recognize the object in the image because the memory 280 does not store any information about the image. To request information from the user about the object, the electronic device 101 may output a predetermined sound alerting the user and understood to request information. However, the disclosure is not limited thereto.

In an embodiment, the electronic device 101 may move to a location of the user 105, and then may request from the user 105, information about the at least one object. For example, the electronic device 101 may determine the location of the user 105 by reading data stored in the memory 280. A processor 290 may control a drive unit 230 to move the electronic device 101 to the location of the user 105. When the electronic device 101 moves to the location of the user 105, the electronic device 101 may request that the user 105 provide the information about the at least one object.

In an embodiment, when the user 105 approaches the electronic device 101, the electronic device 101 may request that the user provide the information about the at least one object. For example, after it is determined that the at least one object is an unknown object (e.g., fails to recognize the object), the electronic device 101 may perform a monitoring operation for another object, based at least in part on a designated path. The electronic device 101 may detect that the user 105 approaches the electronic device 101 while performing the monitoring operation for another object. The processor 290 may request that the user 105 provide information about the at least one object, in response to detecting the proximity of the user 105 to the electronic device 101.

In an embodiment, the electronic device 101 may control another electronic device to request the information about the at least one object from the user. For example, the electronic device 101 may transmit a request for information about the object to another electronic device (e.g., a user's mobile phone) by using a communication unit 210 such that the another electronic device outputs the for the information about the at least one object. It is noted that in order for the user to understand the request, the electronic device 101 may have to provide some information about the object, such as the image of the object captured by the camera with the request.

In an embodiment, the electronic device 101 may obtain the information about the at least one object, from a source external to the electronic device 101.

In an embodiment, the electronic device 101 may obtain the information about the at least one object, based at least in part on a response to a request from the user 105 received through a microphone 260.

In an embodiment, the electronic device 101 may obtain the information on the at least one object, based at least in part on a user input for selecting a screen menu received through a display 270. The screen menu may include information on an object previously registered in the electronic device 101 or may be configured based on information received from an external device (e.g., a server) or the Internet.

In an embodiment, the electronic device 101 may obtain the information about the at least one object, based at least in part on information received through at least one of another electronic device or a server through the communication unit 210. In an embodiment, information received through at least one of another electronic device 101 or the server may include a response to the request inquiring information about the at least one object, which has been input to another electronic device 101 or transmitted to the server by the user 105.

In an embodiment, the electronic device 101 may newly register the at least one object in an object list 283 or update the object list 283, based at least in part on the obtained information about the at least one object.

In an embodiment, the electronic device 101 may output information about a current location of the at least one object, based on an input from a user. For example, the electronic device 101 may receive a voice input inquiring about the current location of the at least one object from the user, through the microphone 260. The electronic device 101 may search for the current location of the at least one object by using, for example, the object list 183. The electronic device 101 may output the discovered current location of the at least one object. The disclosure is not limited to an input for inquiring about the current location of the at least one object is received from the user through a microphone 260. For example, the input for inquiring about the current location of the at least one object may include at least one of a user input on the display 270 or a user input on an external electronic device received through the communication unit 210.

Figure 12:
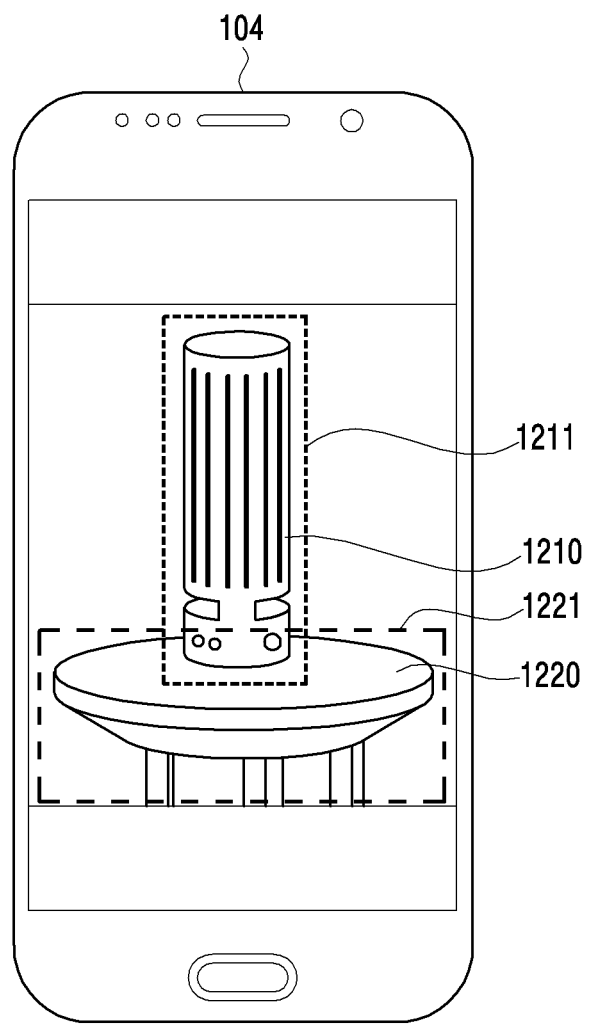
FIG. 12 is an exemplary diagram illustrating a method for designating a plurality of objects as a monitoring target, according to certain embodiments.

FIG. 12 is a diagram illustrating a method for designating a plurality of objects as a monitoring target, according to certain embodiments.

Referring to FIG. 12, FIG. 12 is a diagram relating to a method for selecting at least two objects to be associated with each other from among a plurality of objects by an electronic device 104 (e.g., a user's mobile phone).

In an embodiment, the electronic device 104 may display, through a display, a guide for selecting an association object among a plurality of objects, based at least in part on information about the plurality of objects received from the electronic device 101.

In an embodiment, the electronic device 104 may display, through a display, an indication which allows identification and selection of an image portion of each of the plurality of objects within an image of the plurality of objects. For example, as shown in FIG. 12, the electronic device 104 may display a guide line 1211 for an image portion 1210 of a first object and a guide line 1221 for an image portion 1220 of a second object, through a display 270, so as to allow selection of each and either of the image portion 1210 of the first object and the image portion 1220 of the second object, within the image of the plurality of objects.

In an embodiment, the electronic device 104 may receive, from a user, an input for selecting at least two objects to be associated with each other. For example, the electronic device 104 may receive a user input on each of regions in the guide lines 1211 and 1221 (e.g., an input of touching each of the regions in the guide lines). However, a user input for selecting at least two objects to be associated with each other is not limited to the above-described example.

In an embodiment, the electronic device 104 may transmit an indication of the selected at least two objects to be associated with each other from a user to an electronic device 101. In an embodiment, the electronic device 101 may associate the at least two objects among the plurality of objects, based at least in part on the received information.

Figure 13:
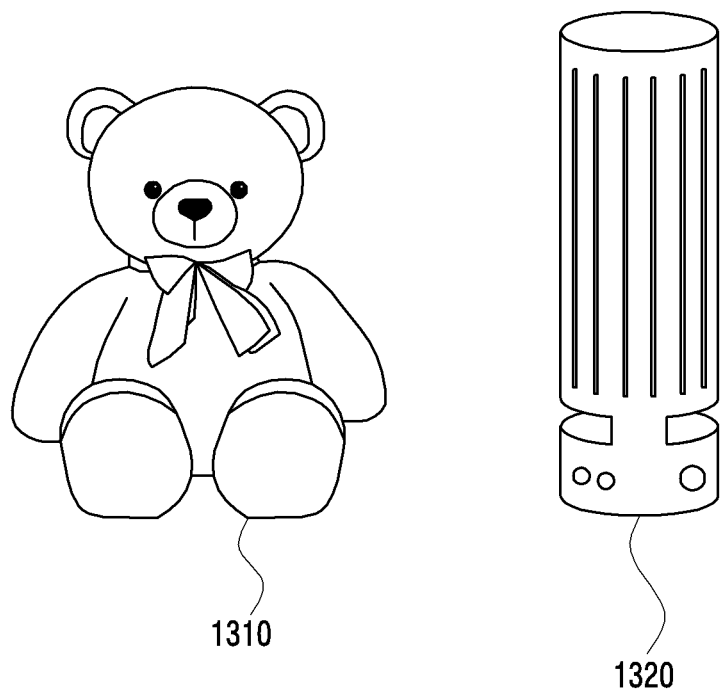
FIG. 13 is an exemplary diagram illustrating a method for performing an operation corresponding to a relation between a plurality of objects designated as a monitoring target, according to certain embodiments.

FIG. 13 is an exemplary diagram illustrating a method for performing an operation corresponding to a relation between a plurality of objects designated as a monitoring target, according to certain embodiments.

Referring to FIG. 13, in an embodiment, an electronic device 101 may identify at least two associated objects in an image, based at least in part on an image photographed while monitoring a space in a house.

In an embodiment, when the electronic device 101 identifies the at least two associated objects among a plurality of objects, the electronic device 101 may identify a relation between the at least two associated objects. For example, the electronic device 101 may determine whether a location relation between the at least two objects (or a state in which the at least two objects are placed) has changed.

In an embodiment, the electronic device 101 may perform an operation corresponding to the relation between the at least two associated objects. In an embodiment, when the relation between the at least two objects is changed, the electronic device 101 may control at least one of the at least two objects to perform a designated function. For example, when a first object 1310 (e.g., a character doll) moves within a designated distance from a second object 1320 (e.g., an AI speaker 250), the electronic device 101 may allow the first object 1310 to control the second object 1320 such that the second object 1320 executes a designated function (or a function related to the first object 1310) (e.g., playing music related to the character) (or may transmit control information to the first object 1310 such that the second object 1320 executes a designated function).

For example, the electronic device 101 may identify the first object, such as stuffed toy that is a bear. The electronic device 101 may make an audible command to the AI tower 1320 to provide information about stuffed to bears, provide information about bears, or play a theme song from a film that includes a bear.

A method according to certain embodiments may include: obtaining an image through a camera 240; obtaining an image of at least one object from the obtained image; determining whether the image of the at least one object corresponds to an image of an object stored in a memory 280; outputting information for inquiring about information on the at least one object, based at least in part on the determination; and obtaining the information on the at least one object, based at least in part on information received from the outside.

In certain embodiments, when it is determined that the image of the at least one object does not correspond to the image of the object stored in the memory 280, the outputting of the information for inquiring about the information on the at least one object may include performing inquiring about the information on the at least one object.

In certain embodiments, the outputting of the information for inquiring about the information on the at least one object may include outputting the information for inquiring about the information on the at least one object, through a speaker 250, and the obtaining of the information on the at least one object may include obtaining the information on the at least one object, based at least in part on information received through a microphone 260.

In certain embodiments, the outputting of the information for inquiring about the information on the at least one object may include transmitting the information for inquiring about the information on the at least one object to an external electronic device (e.g., an electronic device 102 or 104), through a communication unit, such that the external electronic device outputs the information for inquiring about the information on the at least one object. The obtaining of the information on the at least one object may include obtaining the information on the at least one object, based at least in part on information received from the external electronic device through the communication unit.

In certain embodiments, the obtaining of the information on the at least one object may include: when the at least one object is not the same as the object stored in the memory 280, registering the information on the at least one object in the memory 280; and when the at least one object is the same as the object stored in the memory 280, updating information on the object stored in the memory 280 by using the information on the at least one object.

In certain embodiments, the obtaining of the image may include obtaining an image of a plurality of objects from the obtained image, and the method may further include storing a relation between at least two objects among the plurality of objects, so as to associate the at least two objects.

In certain embodiments, the associating of the at least two objects may include: displaying a guide for allowing selection of each of image portions of the plurality of objects, through a display 270; and associating at least two objects, based at least in part on an input for selecting image portions of the at least two objects from among the image portions of the plurality of objects.

In certain embodiments, when the relation between the at least two objects is changed, the method may further include performing a function corresponding to the changed relation.

In certain embodiments, the method may further include: determining a priority between the plurality of objects stored in the memory 280; and configuring monitoring one or more objects among the plurality of objects, based at least in part on the priority.

In addition, a structure of data used in the above-described embodiment may be recorded on a computer-readable recording medium through various means. The computer-readable recording medium may include a storage medium such as a magnetic storage medium (e.g., a ROM, a floppy disk, a hard disk, etc.) and an optical reading medium (e.g., a CD-ROM, a DVD, etc.).

In an embodiment, a computer-readable recording medium may record a program for executing, by an electronic device 101: obtaining an image through a camera 240; obtaining an image of at least one object from the obtained image; determining whether the image of the at least one object corresponds to an image of an object stored in a memory 280; outputting information for inquiring about information on the at least one object, based at least in part on the determination; and obtaining the information on the at least one object, based at least in part on information received from the outside.

The disclosure has been discussed above in connection with the exemplary embodiments thereof. It will be understood by those skilled in the art to which the disclosure belongs that the disclosure may be implemented in modified forms without departing from the essential characteristics of the disclosure. Therefore, the embodiments disclosed herein should be considered from an illustrative point of view, rather than a limitative point of view. The scope of the disclosure is found not in the above description but in the accompanying claims, and all differences falling within the scope equivalent to the claims should be construed as being included in the disclosure.

What is claimed is:

1. An electronic device comprising:
a camera;
a memory; and
at least one processor,
wherein the at least one processor is configured to:
obtain an image through the camera; obtain an image of at least one object from the obtained image;
determine whether the image of the at least one object corresponds to an image of an object stored in the memory;
when it is determined that the image of the at least one object does not correspond to the image of the object stored in the memory, output a request for information about the at least one object to an external source; and
obtain the information on the at least one object, based at least in part on information received from the external source.

2. The electronic device of claim 1, further comprising:
a speaker; and
a microphone,
wherein the at least one processor is configured to output the request for the information about the at least one object, through the speaker, and obtain the information about the at least one object, based at least in part on information received through the microphone.

3. The electronic device of claim 1, further comprising a display,
wherein the at least one processor is configured to request for the information about the at least one object, through the display, and obtain the information about the at least one object, based at least in part on information received from the external source.

4. The electronic device of claim 1, further comprising a communication unit,
wherein the at least one processor is configured to: transmit the request for the information about the at least one object to an external electronic device using the communication unit; and obtain the information about the at least one object, based at least in part on information received from the external electronic device by the communication unit.

5. The electronic device of claim 1, wherein the at least one processor is configured to: when the at least one object is not the same as the object stored in the memory, store the information about the at least one object in the memory; and when the at least one object is the same as the object stored in the memory, update information about the object stored in the memory.

6. The electronic device of claim 1, wherein the at least one processor is configured to obtain an image of a plurality of objects from the obtained image, and store a relation between at least two objects among the plurality of objects.

7. The electronic device of claim 6, further comprising a display,
wherein the at least one processor is configured to: display a guide for allowing selection of each of image portions of the plurality of objects, through the display; and associate at least two objects, based at least in part on an input for selecting image portions of the at least two objects from among the image portions of the plurality of objects.

8. The electronic device of claim 6, wherein the at least one processor is configured to, when the relation between the at least two objects is changed, perform a function corresponding to the changed relation.

9. The electronic device of claim 1, wherein the at least one processor is configured to determine a priority between a plurality of objects stored in the memory, and configure monitoring one or more objects among the plurality of objects, based at least in part on the priority.

10. A method comprising:
obtaining an image through a camera;
obtaining an image of at least one object from the obtained image;
determining whether the image of the at least one object corresponds to an image of an object stored in a memory;
when it is determined that the image of the at least one object does not correspond to the image of the object stored in the memory, outputting a request for information about the at least one object to an external source; and
obtaining the information about the at least one object, based at least in part on information received from the external source.

11. The method of claim 10, wherein the outputting the request for the information about the at least one object comprises outputting the request for the information about the at least one object, through a speaker, and
the obtaining of the information about the at least one object comprises obtaining the information about the at least one object, based at least in part on information received through a microphone.

12. The method of claim 10, wherein the outputting the request for the information about the at least one object comprises transmitting, to an external electronic device, the request for the information about the at least one object, using a communication unit, and
the obtaining of the information about the at least one object comprises obtaining the information about the at least one object, based at least in part on information received from the external electronic device through the communication unit.

13. The method of claim 10, wherein the obtaining of the information about the at least one object comprises: when the at least one object is not the same as the object stored in the memory, registering the information about the at least one object in the memory; and when the at least one object is the same as the object stored in the memory, updating information about the object stored in the memory.

14. The method of claim 10, wherein the obtaining of the image comprises obtaining an image of a plurality of objects from the obtained image, and further comprises storing a relation between at least two objects among the plurality of objects.

15. The method of claim 14, further comprising: displaying a guide for allowing selection of each of image portions of the plurality of objects, through a display; and associating the at least two objects, based at least in part on an input for selecting image portions of the at least two objects from among the image portions of the plurality of objects.

16. The method of claim 14, further comprising
when the relation between the at least two objects is changed, performing a function corresponding to the changed relation.

17. The method of claim 10, further comprising:
determining a priority between a plurality of objects stored in the memory; and
configuring monitoring one or more objects among the plurality of objects, based at least in part on the priority.

18. A computer-readable recording medium on which programs executable by a computer are recorded, the programs being executed by the computer and comprising:
obtaining an image through a camera;
obtaining an image of at least one object from the obtained image;
determining whether the image of the at least one object corresponds to an image of an object stored in a memory;
when it is determined that the image of the at least one object does not correspond to the image of the object stored in the memory, outputting a request for information about the at least one object to an external source; and
obtaining the information about the at least one object, based at least in part on information received from the external source.

* * * * *